(12) United States Patent
Van Bodegraven

(10) Patent No.: US 9,807,831 B2
(45) Date of Patent: *Oct. 31, 2017

(54) SELF-ADJUSTING LIGHTING DRIVER FOR DRIVING LIGHTING SOURCES AND LIGHTING UNIT INCLUDING SELF-ADJUSTING LIGHTING DRIVER

(71) Applicant: PHILIPS LIGHTING HOLDING B.V., Eindhoven (NL)

(72) Inventor: Tijmen Cornelis Van Bodegraven, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/356,183

(22) PCT Filed: Oct. 30, 2012

(86) PCT No.: PCT/IB2012/056010
§ 371 (c)(1),
(2) Date: May 5, 2014

(87) PCT Pub. No.: WO2013/064973
PCT Pub. Date: May 10, 2013

(65) Prior Publication Data
US 2014/0300278 A1    Oct. 9, 2014

Related U.S. Application Data

(60) Provisional application No. 61/555,667, filed on Nov. 4, 2011.

(30) Foreign Application Priority Data

Jan. 19, 2012   (EP) .................................... 12151744

(51) Int. Cl.
H05B 41/28       (2006.01)
H05B 33/08       (2006.01)

(52) U.S. Cl.
CPC ....... *H05B 33/0827* (2013.01); *H05B 33/083* (2013.01); *H05B 33/0815* (2013.01); *H05B 33/0854* (2013.01)

(58) Field of Classification Search
USPC ..... 315/247, 224, 225, 209 R, 291, 307–326
See application file for complete search history.

(56) References Cited

U.S. PATENT DOCUMENTS 7,148,632 B2    12/2006  Berman et al.
9,096,168 B2 *   8/2015  Kuang ................. B60Q 3/0259
(Continued)

FOREIGN PATENT DOCUMENTS

CN          1604712 A      4/2005
JP       2004165130 A      6/2004
(Continued)

*Primary Examiner* — Tuyet Vo
(74) *Attorney, Agent, or Firm* — Akarsh P. Belagodu

(57) ABSTRACT

A lighting unit (100) includes light emitting diode (LED) modules (120, 300) and a lighting driver (110, 200) connected to the LED modules. Each LED module includes LEDs (323) and an identification current source (324) supplying an identification current to an identification current output node (180, 380). All of the identification current output nodes are connected together to supply a total identification current having a magnitude which changes in response to the number of LED modules that are connected to the lighting driver. The lighting driver includes: a controllable current source (220 & 250) to supply an LED driving current to the LEDs of the LED modules, and a controller (230) that responds to the total identification current to control the controllable current source to supply the LED driving current at a magnitude which changes in
(Continued)

response to the number of LED modules that are connected to the lighting driver.

21 Claims, 3 Drawing Sheets

(56) References Cited

U.S. PATENT DOCUMENTS

| | | |
|---|---|---|
| 2004/0135522 A1 | 7/2004 | Berman et al. |
| 2006/0132063 A1 | 6/2006 | Hung et al. |
| 2006/0267514 A1 | 11/2006 | Xu |
| 2007/0139317 A1 | 6/2007 | Martel et al. |
| 2008/0224634 A1 | 9/2008 | Scilia |
| 2010/0109570 A1 | 5/2010 | Weaver |
| 2015/0173142 A1* | 6/2015 | Van Der Veen ... H05B 33/0851 315/151 |

FOREIGN PATENT DOCUMENTS

| | | |
|---|---|---|
| JP | 2007511063 A | 4/2007 |
| JP | 2007201473 A | 8/2007 |
| JP | 2008509523 A | 3/2008 |
| JP | 2008543045 A | 11/2008 |
| JP | 2011181295 A | 9/2011 |
| WO | 2008071206 A1 | 6/2008 |
| WO | WO2008071206 | 6/2008 |

* cited by examiner

US 9,807,831 B2

SELF-ADJUSTING LIGHTING DRIVER FOR DRIVING LIGHTING SOURCES AND LIGHTING UNIT INCLUDING SELF-ADJUSTING LIGHTING DRIVER

TECHNICAL FIELD

The present invention is directed generally to a lighting driver for driving one or more light sources, in particular light-emitting diode (LED) light sources, and a lighting unit including a lighting driver. More particularly, various inventive methods and apparatus disclosed herein relate to a self-adjusting lighting driver for driving one or more light-emitting diode (LED) light sources, and an LED-based lighting unit including a self-adjusting lighting driver.

BACKGROUND

Illumination devices based on semiconductor light sources, such as light-emitting diodes (LEDs), offer a viable alternative to traditional fluorescent, HID, and incandescent lamps. Functional advantages and benefits of LEDs include high energy conversion and optical efficiency, longer expected lifetime, lower operating costs, and many others.

In some applications, an LED-based lighting unit may include a lighting driver which supplies an LED driving current to a plurality of LED modules which in turn each include one or more LEDs. Here, an LED module may include a circuit board (e.g., a printed circuit board) having one or more LEDs mounted thereon. In some embodiments, such circuit boards may be plugged into slots in a lighting fixture, or a motherboard, on which, in some embodiments, the lighting driver may be provided.

In different applications and installations, an LED-based lighting unit may include different numbers of LEDs and/or LED modules. For example, the number of LEDs and LED modules may be changed depending on the light output requirements, e.g. lumens, for a particular installation.

From a manufacturing standpoint, it would be desirable for a manufacturer to reduce the number of different components that they need to manufacture and maintain in stock to assemble a large number of different LED-based lighting units having a wide variety of light output requirements. Accordingly, it would be desirable to be able to use the same lighting driver for different LED-based lighting units which have a wide variation in the number of LEDs and LED modules which are included therein.

In general, the magnitude or level of the LED driving current output by a lighting driver will need to be changed according to the number of LEDs and LED modules to which it is connected and which it drives. This means that if a single lighting driver is going to be employed in a variety of LED-based lighting units with different numbers of LEDs and/or LED modules, then the lighting driver will have to include a means or provision for adjusting the LED driving current to match the current driving requirements for the different LED lighting units according to the different numbers of light sources that they include. Meanwhile, the number of LEDs and LED modules to be included in a particular LED-based lighting unit is determined at the time of manufacturing that LED lighting unit. Thus, if the same lighting driver is to be employed in a variety of LED lighting units with different numbers of LEDs and LED modules, then the lighting driver would have to be programmed at the time of manufacturing for each different LED lighting unit so that its output LED driving current is appropriate for the particular number of LEDs and LED modules that are included in that LED lighting unit.

However, individually programming the lighting driver of each LED-based lighting unit imposes costs and constraints on the manufacturing environment. For example, such programming may require that the manufacturing facility include special equipment and personnel with special knowledge and ability to program the lighting driver at the time when the number of LED modules is selected for the LED lighting unit.

On the other hand, as noted above, if a lighting driver with a fixed LED driving current is used for each LED-based lighting unit that has a different number of LED modules, then the manufacturing facility will be required to build and stock a large number of different lighting drivers. Furthermore, field repair or replacement of lighting drivers becomes more complicated and expensive if there are a large number of different lighting drivers, each corresponding to a particular LED lighting unit having a particular number of LEDs and LED modules.

Another issue that arises with LED-based lighting units pertains to temperature. The lifetime of an LED is substantially affected by the temperature at which it is operated, which in turn is affected by the LED driving current flowing through it. So it would be desirable for a lighting driver to be able to reduce the current passing through an LED when its temperature increases above a nominal temperature, or a threshold temperature, so as to decrease the temperature of the LED and thereby extend its lifetime.

Thus, it would be desirable to provide a lighting driver, and an LED-based lighting unit that includes a lighting driver which can satisfy one or more of these needs.

SUMMARY

The present disclosure is directed to inventive methods and apparatus for a lighting driver, and a lighting unit that includes a lighting driver. For example, in some embodiments a driving driver can automatically adjust the magnitude of the LED driving current that it supplies to match the requirements of the LEDs that it drives.

Generally, in one aspect, the invention relates to a system that includes: a plurality of light emitting diode (LED) modules, and a lighting driver operatively connected to each of the plurality of LED modules. Each LED module includes a corresponding plurality of LEDs and a corresponding identification current source supplying an LED module identification current to a corresponding LED module identification current output node of the LED module, and all of the LED module identification current output nodes of the plurality of LED modules are connected together to supply a total LED module identification current having a total LED module identification current magnitude which changes in response to a number of the plurality of LED modules that are operatively connected to the lighting driver. The lighting driver includes: a controllable current source connected to supply an LED driving current to the LEDs of the LED modules; and a controller configured to respond to the total LED module identification current to control the controllable current source to supply the LED driving current at an LED driving current magnitude which changes in response to the number of the plurality of LED modules that are operatively connected to the lighting driver.

In one embodiment, each LED module further includes a corresponding temperature compensation current source that is configured to reduce the LED module identification current from the LED module when a sensed temperature of the LED module exceeds a threshold.

In another embodiment, each identification current source includes a corresponding current mirror connected between a corresponding LED driving current input node of the corresponding LED module for receiving the LED driving current from the lighting driver, and the LED module identification current output node. According to one optional feature of this embodiment, each of the plurality of LED modules includes a corresponding LED driving current return node, wherein all of the LED driving current return nodes of the plurality of LED modules are connected together and to an LED driving current return node of the lighting driver to return the LED driving current to the lighting driver.

According to another embodiment, when an additional LED module is added to the system, the lighting driver detects the additional LED module and automatically increases the LED driving current.

According to yet another embodiment, in each LED module, the plurality of LEDs includes a plurality of LED strings in parallel with each other, wherein each LED string comprises at least two LEDs.

According to still another embodiment, each LED module includes its own corresponding circuit board having the corresponding plurality of LEDs and the corresponding identification current source disposed thereon.

According to a further embodiment, the lighting driver includes a resistor divider network configured to receive the total LED module identification current and further to receive an LED driving return current returned from all of the LED modules, and in response thereto to provide an LED driving current adjustment signal to the controller for adjusting the LED driving current magnitude so that it changes in response to the number of the plurality of LED modules that are connected to the lighting driver.

Generally, in another aspect, the invention relates to a lighting driver including: a controllable current source configured to supply a driving current to one or more lighting modules which each include at least one light source; and a controller configured to respond to a total identification current supplied from the one or more lighting modules and in response thereto to control the controllable current source to supply the driving current at a driving current magnitude which changes in response to a number of the one or more lighting modules that are operatively connected to the lighting driver.

In one embodiment, the lighting driver further includes a resistor divider network configured to receive the total identification current at an identification current input node, and further configured to receive a driving return current returned from the one or more lighting modules at a driving current return node, and further configured in response thereto to provide a driving current adjustment signal to the controller for adjusting the driving current magnitude so that it changes in response to the number of the one or more lighting modules that are operatively connected to the lighting driver.

According to one optional feature of this embodiment, the resistor divider network comprises: a set resistor connected between the identification current input node and the driving current return node; a sense resistor connected between the driving current return node and ground; a first resistor connected between the identification current input node and a control node supplying the driving current adjustment signal to the controller; and a second resistor connected between the control node and ground.

According to another optional feature of this embodiment, the controllable current source comprises a switching device configured to be switched in response to a switching control signal provided from the controller, wherein the driving current magnitude is changed in response to the duty cycle and/or the switching frequency of the switching device.

Generally, in yet another aspect, the invention focuses on a lighting module that includes: a least one light source; a driving current input node configured to receive a driving current and to supply the driving current to the at least one light source; a driving current return node connected to the at least one light source and configured to output a driving return current returned from the at least one light source; an identification current output node; and an identification current source connected between the driving current input node and the identification current output node and configured to output an identification current to the identification current output node.

In one embodiment, the lighting module further includes a temperature compensation current source that is configured to reduce the identification current output by the lighting module as a sensed temperature of the lighting module increases.

According to one optional feature of this embodiment, the identification current source is a current mirror.

According to another optional feature of this embodiment, the temperature compensation current source includes a pair of reference voltage sources, and wherein one of the pair of voltage sources includes a negative current coefficient element such a reference voltage of a first one of the pair of reference voltage sources changes with temperature more than a reference voltage of a second one of the pair of reference voltage sources changes with temperature.

According to yet another optional feature of this embodiment, the at least one lighting module includes a plurality of LED strings in parallel with each other, wherein each LED string comprises at least two LEDs.

In another embodiment, the lighting module further includes a circuit board having the identification current source and the at least one LED disposed thereon.

In some embodiments, the lighting module further includes a light sensor configured to detect an amount of ambient light in an environment of the lighting module.

According to one optional feature of these embodiments, the lighting module is configured to disable the output of the identification current in response to the light sensor detecting that that the ambient light in the environment of the lighting module exceeds a threshold.

In some embodiments, the lighting module further includes a presence sensor configured to detect whether a human being is present in an environment of the lighting module.

According to one optional feature of these embodiments, the lighting module is configured to disable the output of the identification current in response to the light sensor detecting that no human being is present in the environment of the lighting module.

Generally, in still another aspect, the invention relates to a system that includes: one or more lighting modules; a lighting driver; and a cable consisting of three wires configured to operatively connect the lighting driver to the one or more lighting modules. The three wires include a first wire carrying a driving current, a second wire carrying a driving return current, and a third wire carrying a total lighting module identification current.

Generally, in a further aspect, the invention focuses on a lighting driver configured to be connected to one or more lighting modules. The lighting driver includes a circuit for generating a driving current; and an interface for a cable to operatively connect the lighting driver to the one or more lighting modules. The cable consists of three wires, including a first wire carrying the driving current from the lighting driver, a second wire carrying a driving return current from the one or more lighting modules, and a third wire carrying a total lighting module identification current from the one or more lighting modules.

Generally, in yet a further aspect, the invention contemplates a lighting module configured to be connected to a lighting driver. The lighting module includes one more light sources; an identification current generator configured to generate an identification current to be output by the lighting module; and an interface for a cable to operatively connect the lighting module to the lighting driver. The cable consists of three wires, including a first wire carrying a driving current from the lighting driver for the one or more light sources, a second wire carrying a driving return current from the lighting module, and a third wire carrying a lighting module identification current from the lighting module.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A "lighting driver" is used herein to refer to an apparatus that supplies electrical power to one or more light sources in a format to cause the light sources to emit light. In particular, a lighting driver may receive electrical power in a first format (e.g., AC Mains power; a fixed DC voltage; etc.) and supplies power in a second format that is tailored to the requirements of the light source(s) (e.g., LED light source(s)) that it drives.

The term "lighting module" is used herein to refer to a module, which may include a circuit board (e.g., a printed circuit board) having one or more light sources mounted thereon, as well as one or more associated electronic components, such as sensors, current sources, etc., and which is configured to be connected to a lighting driver. Such lighting modules may be plugged into slots in a lighting fixture, or a motherboard, on which the lighting driver may be provided. The term "LED module" is used herein to refer to a module, which may include a circuit board (e.g., a printed circuit board) having one or more LEDs mounted thereon, as well as one or more associated electronic components, such as sensors, current sources, etc., and which is configured to be connected to a lighting driver. Such lighting modules may be plugged into slots in a lighting fixture, or a motherboard, on which the lighting driver may be provided.

The terms "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry; a lighting driver) relating to the operation of the light source(s). An "LED-based lighting unit" refers to a lighting unit that includes one or more LED-based light sources as discussed above, alone or in combination with other non LED-based light sources.

The terms "lighting fixture" and "luminaire" are used herein interchangeably to refer to an implementation or arrangement of one or more lighting units in a particular form factor, assembly, or package, and may be associated with (e.g., include, be coupled to and/or packaged together with) other components.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

As discussed above, it is undesirable to have to manufacture, stock and supply different lighting drivers for a different LED-based lighting units depending on the number of LED modules that are included the different units. It is also undesirable for LEDs in an LED-based lighting unit to be operated at temperatures which are too high and which can reduce the lifetime of the LEDs.

Therefore, the present inventor has recognized and appreciated that it would be beneficial to provide a lighting driver that can be installed in a variety of LED-based lighting units which have a wide variation in the number of LEDs and LED modules which are included, and which can be manufactured in a facility without the need for special equipment and personnel with special knowledge and the ability to program the lighting driver. The inventor has also recognized that it would be beneficial to provide such a lighting driver which can reduce the current supplied to LEDs when the temperature of the LED module exceeds a nominal or threshold amount.

In view of the foregoing, various embodiments and implementations of the present invention are directed to a self-adjusting lighting driver and an LED-based lighting unit that includes a self-adjusting lighting driver.

Figure 1:
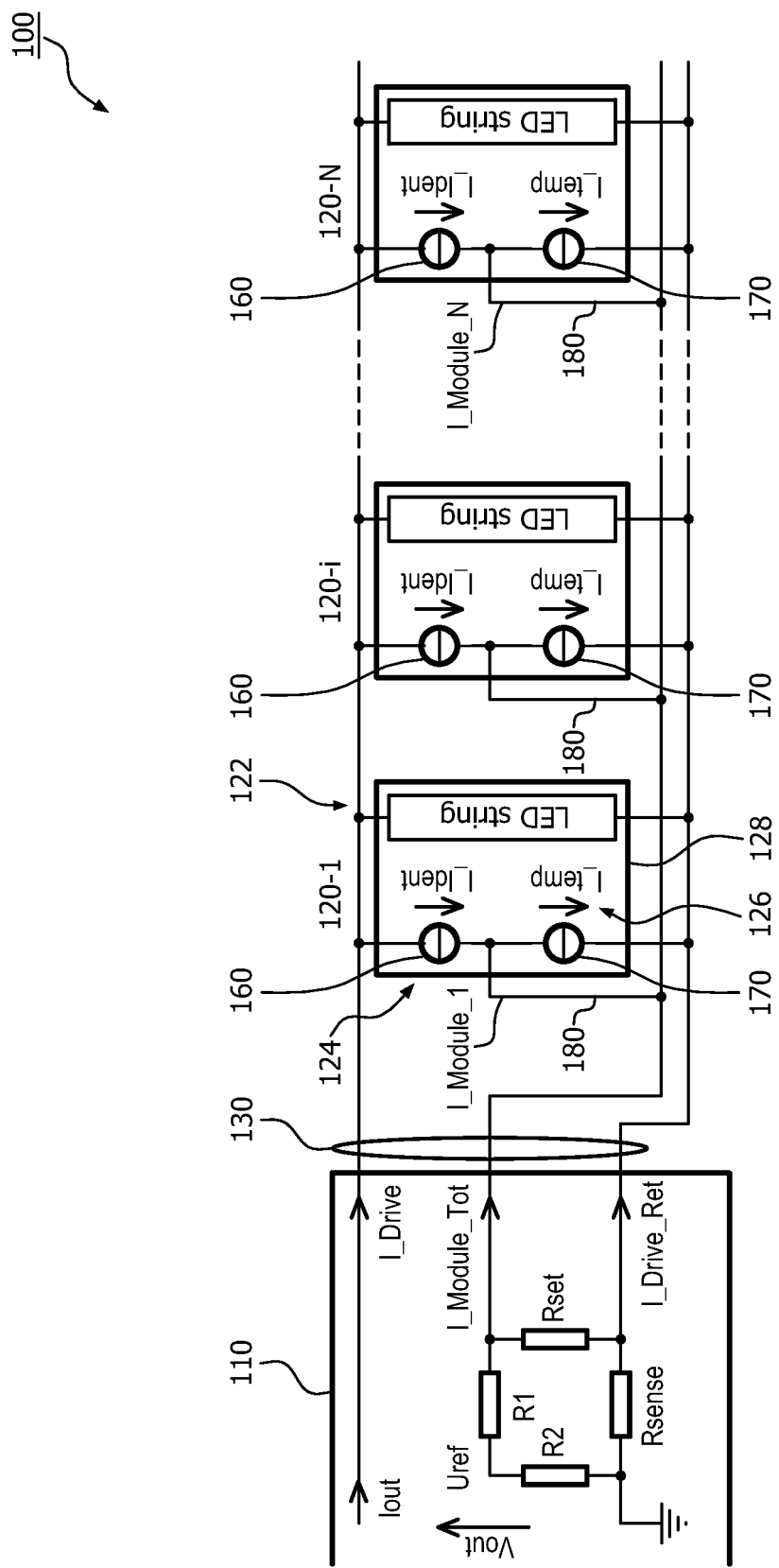
FIG. 1 illustrates an example embodiment of an LED-based lighting unit.

FIG. 1 illustrates an example embodiment of a light emitting diode (LED) lighting unit 100, which includes a lighting driver 110 connected to a plurality (N) of LED modules 120-1~120-N by a cable 130 consisting of three wires, as described in greater detail below with respect to FIG. 2.

In general, lighting driver 110 can include any general circuit for supplying a controlled LED driving current I_Drive to LED modules 120-1~120-N, together with a circuit, examples of which are described below, for automatically adjusting the level or magnitude of that LED driving current I_Drive in response to the current requirements of the connected of LED modules 120-1~120-N. In a particular embodiment, as explained below, lighting driver 110 includes circuitry that can work in conjunction with of LED modules 120-1~120-N to automatically self-adjust the level or magnitude of LED driving current I_Drive to increase as the number N of LED modules present in LED lighting unit 100 increases, and to decrease as the number N of LED modules present in LED lighting unit 100 decreases. Thus, the same lighting driver 110 can be used, for example, for a first embodiment of LED lighting unit 100 having N=8 LED modules 120 and for a second embodiment of LED lighting unit 100 having N=4 LED modules.

LED module 120 includes one or more LED strings 122, a first current source 124, a second current source 126 and a circuit board 128. To avoid confusion and for clarification, first current source 124 is hereinafter referred to "identification current source" 124, and second current source 126 is hereinafter referred to as "temperature compensating current source" 126.

In some embodiments of lighting units, the LED module may not include temperature compensating current source 126. In some embodiments of lighting units, the LED module may not include a separate circuit board. Accordingly, the term "LED module" should be considered to broadly apply to a unit that includes at a minimum at least one LED and at least one identification current source 124.

As shown in FIG. 1, each LED module 120-i receives an LED driving current at an LED driving current input node 160 as a portion of the total LED driving current I_Drive output by lighting driver 110, and returns an LED driving return current I_Drive_Ret via an LED driving current return node 170. LED module 120 also outputs an LED module identification current I_Module via an LED module identification current output node 180. As will be explained in greater detail with respect to the discussion of FIG. 3 below, LED module identification current I_Module is the difference between the current I_Ident of identification current source 124 and the temperature compensation current I_Temp of temperature compensating current source 126:

$$I\_Module = I\_ident - I\_Temp \tag{1}$$

As shown in FIG. 1, each of LED modules 120-1~120-N outputs a corresponding LED module identification current I_Module_1~I_Module_N. All of the LED module identification current output nodes 180 of the plurality of LED modules 120-1~120-N are connected together to supply a total LED module identification current I_Module_Tot to lighting driver 110, where:

$$I\_Module\_Tot = \sum_{i=1}^{N} I\_Module\_i \qquad (2)$$

The total LED module identification current I_Module_Tot has a total LED module identification current magnitude which changes in response to the number (N) of the plurality of LED modules 120 that are present in LED lighting unit 100.

In particular, assuming as an example that each of the LED modules 120-1~120-N outputs an LED module identification current I_Module that has a same level or magnitude, then the total identification current, I_Module_Tot, is:

$$I\_Module\_Tot = N * I\_Module. \qquad (3)$$

This example might apply, for example, in embodiments where LED modules 120-1~120-N all include the same number of LED strings, and do not include any temperature compensating current source 126. Also, equation (3) might apply in a case where none of the temperature compensating current sources 126 are turned on in response to a high temperature in a corresponding LED module 120, as will be explained in greater detail with respect to the discussion of FIG. 3 below.

Therefore, the total LED module identification current I_Module_Tot provides an indication of the number of LED modules 120-1~120-N are that are connected to lighting driver 110 to be driven by lighting driver 110. More generally, I_Module_Tot provides to lighting driver 110 an indication of the current driving requirements of the connected LED modules 120-1~120-N.

Figure 2:
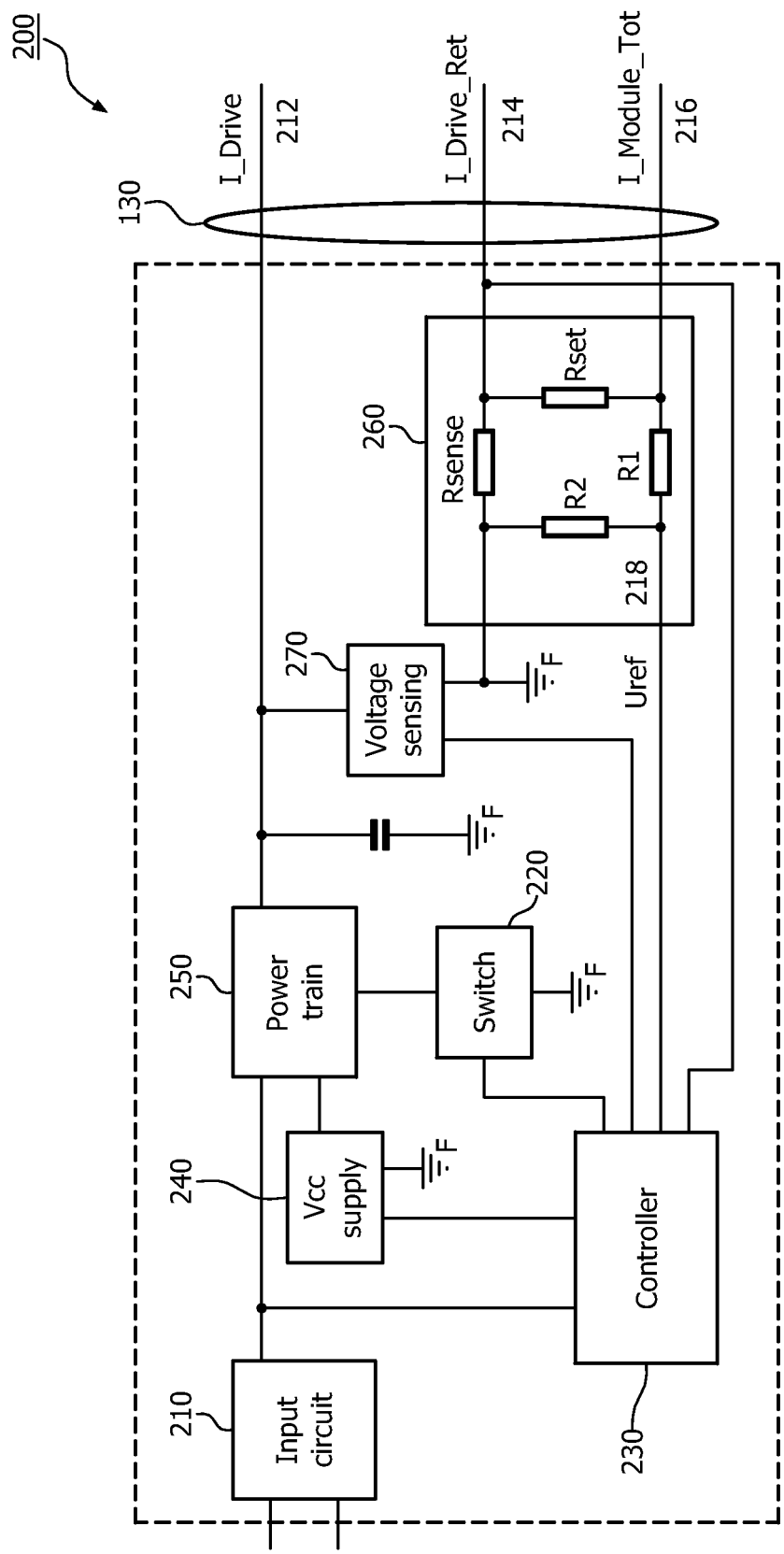
FIG. 2 illustrates one example embodiment of a lighting driver for an LED-based lighting unit.

FIG. 2 illustrates one example embodiment of a lighting driver 200 for an LED lighting unit. Lighting driver 200 may be one embodiment of lighting driver 110 in lighting unit 100. Many other specific circuit designs are possible for other embodiments of lighting driver 200 which differ from that shown in FIG. 2, but this embodiment is set forth as an example to illustrate a self-adjusting lighting driver adjusting the level or magnitude of an LED driving current in response to a total LED module identification current I_Module_Tot provided to it by a plurality of LED modules.

Lighting driver 200 includes a rectifier 210, a switching device 220, a controller 230, a Vcc supply 240, a power train 250, a resistor divider network 260, and optionally, a voltage sensor 270 for sensing an LED voltage across the output of lighting driver 200. Lighting driver 200 also includes an LED driving current output node 212, an LED driving current return node 214, and a total identification current input node 216. LED driving current output node 212, LED driving current return node 214, and total identification current input node 216 provide an interface for a cable 130 to operatively connect lighting driver 200 to one or more lighting modules, in particular LED modules. Beneficially, cable 130 consists of only three wires, including a first wire carrying the LED driving current I_Drive from lighting driver, a second wire carrying the LED driving return current I_Drive_Ret from the one or more lighting modules, and a third wire carrying the total LED module identification current I_Module_Tot from the one or more lighting modules to lighting driver 200. Resistor divider network 260 includes: a set resistor Rset connected between identification current input node 216 and LED driving current return node 214; a sense resistor Rsense connected between LED driving current return node 214 and ground; a first resistor R1 connected between identification current input node 216 and a control node 218 supplying a driving current adjustment signal Uref to controller 230; and a second resistor connected between control node 218 and ground. The LED driving return current I_Drive_Ret is received by lighting driver 200 via LED driving current return node 214; and is provided to controller 230, as measured across sense resistor Rsense for controlling the magnitude of the LED driving current I_Drive.

In operation, switching device 220 together with power train 250 functions as a controllable current source or supply for the LED driving current I_Drive. Controller 230 supplies a switching control signal to switching device 220 via switching driver 250. By controlling the switching duty cycle and/or switching frequency of switching device 220, controller 230 can control a magnitude or level of the LED driving current I_Drive. Controller 230 sets the duty cycle and/or switching frequency of switching device 220, and thereby the magnitude or level of the LED driving current I_Drive, in response to the voltage Uref generated by resistor divider network 260, which is in turn generated from the total LED module identification current I_Module_Tot according to Equation (4):

$$U_{ref} = \left( \frac{(R_{set} + R_{sense}) \cdot (R_1 + R_2)}{R_{set} + R_{sense} + R_1 + R_2} \cdot I\_Module\_Tot + R_{sense} \cdot I\_Drive \right) \cdot \frac{R_2}{R_1 + R_2} \qquad (4)$$

Beneficially, R1=R2 and both R1 and R2 have a value that is much higher than Rset, while the value of Rset in turn is much higher than the value of Rsense (e.g., Rset≈1000*Rsense).

Controller 230 uses the voltage Uref as an LED driving current adjustment signal for adjusting the magnitude or level of the LED driving current, I_Drive, which will be:

$$I\_Drive = I\_Module\_Tot \cdot \frac{R_{set}}{R_{sense}} \qquad (5)$$

So, as can be seen from Equation (5), the LED driving current I_Drive is a function of the total LED module identification current I_Module_Tot provided by the LED modules. Combined with Equation (3), in the case where all of the each of the LED modules outputs an LED module identification current I_Module with the same level or magnitude, then the LED driving current I_Drive becomes:

$$I\_Drive = N * (I\_Module) \cdot \frac{R_{set}}{R_{sense}} \qquad (6)$$

From Equations (5) and (6) it can be seen that lighting driver 200 automatically self-adjusts the LED driving current which it supplies, I_Drive, in response to the number N of LED modules that are present in the lighting unit and being driven by lighting driver 200.

Furthermore, in the case where each LED module includes a temperature compensating current source as shown in FIG. 1 and described in greater detail below with respect to FIG. 3, the total LED module identification current I_Module_Tot will be reduced when the sensed temperature of any one or more of the LED modules exceeds a nominal or threshold temperature. Thus, according to equation (5), the LED driving current I_Drive will also be decreased, reducing the current supplied to the LEDs of the LED modules, thereby reducing their operating temperatures and prolonging their expected lifetimes.

Figure 3:
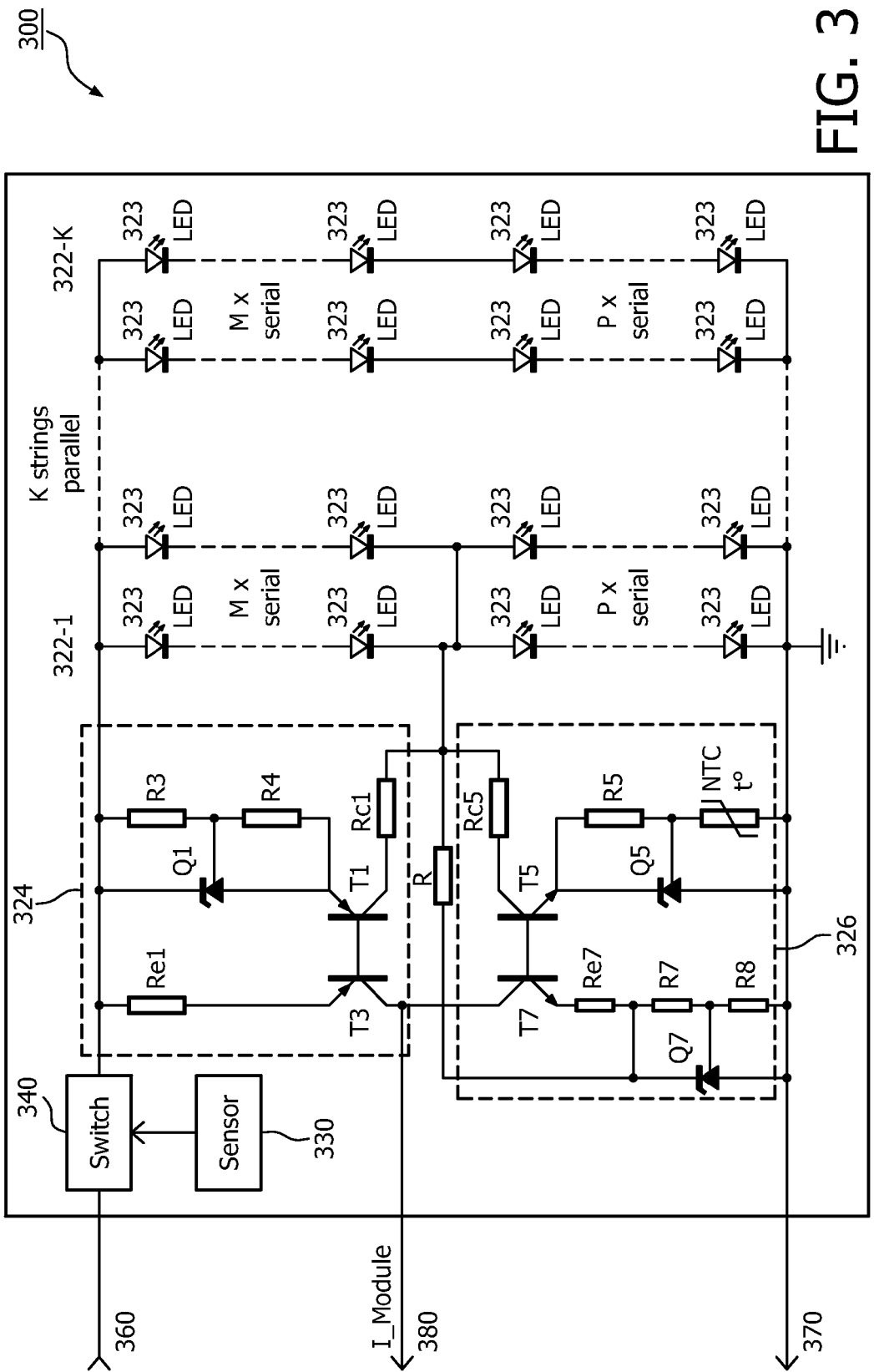
FIG. 3 is a schematic diagram of a circuit of one embodiment of an LED module.

FIG. 3 is a schematic diagram of a circuit of one embodiment of an LED module 300. LED module 300 includes a plurality (K) of LED strings 322-1~322-K, each of which LED strings 322-1~322-K includes a plurality of LEDs 323 in series with each other, and which in some cases may include a first group of M (e.g., M=5) LEDs 323 in series with a second group of P (e.g., P=6) LEDs 323. LED module 300 also includes a first "identification" current source 324, and a second "temperature compensating" current source 326.

Identification current source 324 includes transistors T1 & T3, a shunt voltage reference Q1, and the resistors R3, R4 and Re1 and is connected between LED driving current input node 360 and an LED module identification current output node 380. Temperature compensating current source 326 includes the transistors T5 & T7, the voltage references Q5 and Q7, the resistors R5, R7, R8 and Re7, and the negative temperature coefficient element NTC. The transistor pairs T1 & T3, and T5 & T7, can be matched double transistors, double transistors or two single transistors, depending on the desired tolerance for corresponding current source. The resistors Rc1, Rc5 and R couple identification current source 324, temperature compensating current source 326, and LED string 322-1 together.

In operation, LED module 300 receives a portion of the LED driving current I_Drive via an LED driving current input node 360, and returns a portion of the LED driving return current I_Drive_Ret via an LED driving current return node 370. LED driving current input node 360 is connected to the LEDs 323 of LED strings 322-1~322-K and LED module 300 supplies the portion of the LED driving current I_Drive to the LEDs 323 of LED strings 322-1~322-K.

Identification current source 324 produces a current I_Ident. Under an operating condition where the sensed temperature of LED module 300 is less than a nominal or threshold value, then temperature compensating current source 326 is off. In that case, LED module 300 outputs the current I_Ident from LED module identification current output node 380 as the LED module identification current I_Module.

As the sensed temperature of LED module 300 increases above a nominal or threshold temperature, then temperature compensation current source 326 is configured to reduce the identification current I_Module supplied from LED module 300. Q7 and Q5 form two voltage sources, one of which one is dependent on temperature due to the negative temperature coefficient element NTC. For example, in one embodiment, NTC may have an impedance of 15 kΩ at 35° C., and a reduced impedance of 2.5 kΩ at +70° C. As the impedance of NTC decreases with temperature, at a certain trigger point (corresponding, for example, to a predetermined threshold temperature) the voltage at the emitter of T5 will equal and then exceed the voltage of voltage reference Q7. When the voltage at the emitter of T5 becomes greater than the voltage of voltage reference Q7, then the transistor T7 will start conducting, producing a temperature compensation current I_Temp whose magnitude increases as the temperature of LED module 300 increases. The temperature compensation current I_Temp is subtracted from the collector current of T3, resulting in a reduced LED module identification current I_Module output from LED module identification current output node 380. As explained above with respect to FIGS. 1 and 2, and as seen from equations (2) and (5) above, when I_Module for one or more LED modules 300 is reduced, then the LED driving current I_Drive supplied by the lighting driver is also decreased, reducing the current passing through the LEDs 323 and thereby lowering the temperature of LED module 300.

As mentioned above, in some embodiments, the LED module 300 may omit temperature compensation current source 326, with the disadvantage of the lighting driver no longer being able to automatically adjust (decrease) the LED driving current when the LED temperature is increased. In that case, the LED module identification current I_Module equals I_Ident produced by identification current source 324.

In some embodiments, as the temperature of a particular LED module 300 continues to increase, then the temperature compensation current I_Temp for that particular LED module 300 may increase until it is greater than the current I_Ident, drawings current from the identification current sources 324 of other LED modules 300 to which it is connected, in which case the particular LED module reduces the total LED module identification current I_Module_Tot that is supplied as feedback to the LED driver.

LED module 300 optionally includes at least one sensor 330 and a switch 340. Sensor(s) may include an ambient light sensor and/or a presence detector for allowing an illumination produced by LED module 300 to be controlled in response to environmental conditions. For example, when an ambient light detector 330 detects that an ambient light level in the environment of LED module 300 is above a certain threshold, and/or when a presence detector 330 does not detect that any human beings are present in the environment of LED module 300, it may be desired to reduce or disable the illumination provided by LED module 300 so as to conserve power consumption. In that case, one or more switches (e.g., switch 340) may be controlled so as to disable receipt of the LED driving current I_Drive and/or to disable the output of the LED module identification current I_Module when, for example, it is detected that the ambient light level in the environment of LED module 300 is above a certain threshold and/or that no human beings are present in the environment of LED module 300.

Therefore, as explained above, in a lighting unit 100 having the above-described LED modules with an on-board identification current source, a self-adjusting lighting driver may automatically tailor its LED driving current to the requirements of the connected LED modules. In particular, the LED lighting driver can supply the LED driving current at an LED driving current magnitude which changes in response to the number of the plurality of LED modules that are present in the system.

It should be understood that although, to provide a concrete illustration, example embodiments have been described above in the context of LED modules that include LED light sources, the concepts described above need not be so limited, and can be applied to lighting drivers supplying power to lighting modules that include other types of light sources and which supply an identification current back to the lighting module to facilitate adjustment by the lighting driver of the level of power which it supplies in response, for example, to the number of lighting modules to which it is connected.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. It should also be understood that, unless clearly indicated to the contrary, in any methods claimed herein that include more than one step or act, the order of the steps or acts of the method is not necessarily limited to the order in which the steps or acts of the method are recited. Also, reference numerals appearing in the claims in parentheses, if any, are provided merely for convenience and should not be construed as limiting the claims in any way.

What is claimed is:

1. A system, comprising:
    a plurality of light emitting diode modules; and
    a lighting driver operatively connected to each of the plurality of LED modules,
    wherein each LED module includes a corresponding plurality of LEDs and a corresponding identification current source supplying an LED module identification current to a corresponding LED module identification current output node of the LED module, and wherein all of the LED module identification current output nodes of the plurality of LED modules are connected together to supply a total LED module identification current having a total LED module identification current magnitude which changes in response to a number of the plurality of LED modules that are operatively connected to the lighting driver, and
    wherein the lighting driver includes:
        a controllable current source connected to supply an LED driving current to the LEDs of the LED modules, and
        a controller configured to respond to the total LED module identification current to control the controllable current source to supply the LED driving current at an LED driving current magnitude which changes in response to the number of the plurality of LED modules that are operatively connected to the lighting driver.

2. The system of claim 1, wherein each LED module further includes a corresponding temperature compensation current source that is configured to reduce the LED module identification current from the LED module when a sensed temperature of the LED module exceeds a threshold.

3. The system of claim 1, wherein when an additional LED module is added to the system, the lighting driver detects the additional LED module and automatically increases the LED driving current.

4. The system of claim 1, wherein in each LED module, the plurality of LEDs includes a plurality of LED strings in parallel with each other, wherein each LED string comprises at least two LEDs.

5. The system of claim 1, wherein each LED module includes its own corresponding circuit board having the corresponding plurality of LEDs and the corresponding LED module identification current source disposed thereon.

6. The system of claim 1, wherein the lighting driver comprises a resistor divider network configured to receive the total LED module identification current and further to receive an LED driving return current returned from all of the LED modules, and in response thereto to provide an LED driving current adjustment signal to the controller for adjusting the LED driving current magnitude so that it changes in response to the number of the plurality of LED modules that are operatively connected to the lighting driver.

7. The system of claim 1, wherein each identification current source comprises a corresponding current mirror connected between a corresponding LED driving current input node of the corresponding LED module for receiving the LED driving current from the lighting driver, and the identification current output node.

8. The system of claim 7, wherein each of the plurality of modules includes a corresponding LED driving current return node, wherein all of the LED driving current return nodes of the plurality of LED modules are connected together and to an LED driving current return node of the lighting driver to return the LED driving current to the lighting driver.

9. A lighting driver, comprising:
    separate first, second, and third nodes;
    a controllable current source configured to supply via the first node a driving current to one or more lighting modules which each include at least one light source, the lighting driver receiving a return driving current from the one or more lighting modules via the second node; and
    a controller configured to respond to a total identification current supplied from the one or more lighting modules and received by the lighting driver via the third node and in response thereto to control the controllable current source to supply the driving current at a driving current magnitude which changes in response to a number of the one or more lighting modules that are operatively connected to the lighting driver.

10. The lighting driver of claim 9, further comprising a resistor divider network configured to receive the total identification current at an identification current input node, and further configured to receive an driving return current returned from the one or more lighting modules at a driving current return node, and further configured in response thereto to provide a driving current adjustment signal to the controller for adjusting the driving current magnitude so that it changes in response to the number of the one or more lighting modules that are operatively connected to the lighting driver.

11. The lighting driver of claim 10, wherein the resistor divider network comprises:
a set resistor (Rset) connected between the identification current input node and the driving current return node;
a sense resistor (Rsense) connected between the driving current return node and ground;
a first resistor connected between the identification current input node and a control node supplying the driving current adjustment signal to the controller; and
a second resistor connected between the control node and ground.

12. The lighting driver of claim 11, wherein the controllable current source comprises a switching device configured to be switched in response to a switching control signal provided from the controller, wherein the driving current magnitude is changed in response to at least one of a duty cycle and a switching rate of the switching device.

13. A lighting module, comprising:
a least one light source;
a driving current input configured to receive a driving current and to supply the driving current to the at least one light source;
a driving current return node connected to the at least one light source and configured to output a driving return current returned from the at least one LED;
an identification current output node; and
an identification current source connected between the driving current input node and the identification current output node and configured to output an identification current to the identification current output node; and
a temperature compensation current source that is configured to reduce the identification current output by the lighting module as a sensed temperature of the lighting module increases.

14. The LED module of claim 13, further comprising a circuit board having the identification current source and the at least one light source disposed thereon.

15. The lighting module of claim 13, further comprising a presence sensor configured to detect whether a human being is present in an environment of the lighting module.

16. The lighting module of claim 13, wherein the identification current source comprises a current mirror.

17. The lighting module of claim 16, wherein the temperature compensation current source comprises a pair of reference voltage sources, and wherein one of the pair of voltage sources includes a negative current coefficient element such that a reference voltage of a first one of the pair of reference voltage sources changes with temperature more than a reference voltage of a second one of the pair of reference voltage sources changes with temperature.

18. The lighting module of claim 17, wherein the at least one light source comprises a plurality of light emitting diode strings in parallel with each other, wherein each LED string comprises at least two LEDs.

19. The lighting module of claim 13, further comprising a light sensor configured to detect an amount of ambient light in an environment of the lighting module.

20. The lighting module of claim 19, wherein the lighting module is configured to disable the output of the identification current in response to the light sensor detecting that that the ambient light in the environment of the lighting module exceeds a threshold.

21. The lighting module of claim 19, wherein the lighting module is configured to disable the output of the identification current in response to the light sensor detecting that no human being is present in the environment of the lighting module.

* * * * *